(12) United States Patent
Parkinson

(10) Patent No.: US 8,099,765 B2
(45) Date of Patent: Jan. 17, 2012

(54) METHODS AND SYSTEMS FOR REMOTE PASSWORD RESET USING AN AUTHENTICATION CREDENTIAL MANAGED BY A THIRD PARTY

(75) Inventor: Steven William Parkinson, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 901 days.

(21) Appl. No.: 11/448,161

(22) Filed: Jun. 7, 2006

(65) Prior Publication Data

US 2008/0046982 A1 Feb. 21, 2008

(51) Int. Cl.
*H04L 29/06* (2006.01)
(52) U.S. Cl. ............................................. 726/5
(58) Field of Classification Search .............. 726/5–7, 726/22, 26, 27, 18; 713/155–156, 183–188
See application file for complete search history.

(56) References Cited

U.S. PATENT DOCUMENTS

| | | | |
|---|---|---|---|
| 4,108,367 A | 8/1978 | Hannan | |
| 4,849,614 A | 7/1989 | Watanabe et al. | |
| 4,924,330 A | 5/1990 | Seamons et al. | |
| 5,247,163 A | 9/1993 | Ohno et al. | |
| 5,355,414 A | 10/1994 | Hale et al. | |
| 5,499,371 A | 3/1996 | Henninger et al. | |
| 5,594,227 A | 1/1997 | Deo | |
| 5,631,961 A | 5/1997 | Mills et al. | |
| 5,666,415 A | 9/1997 | Kaufman | |
| 5,721,781 A | 2/1998 | Deo et al. | |
| 5,745,576 A | 4/1998 | Abraham et al. | |
| 5,745,678 A | 4/1998 | Herzberg et al. | |
| 5,768,373 A | 6/1998 | Lohstroh et al. | |
| 5,862,310 A | 1/1999 | Crawford et al. | |
| 5,923,884 A | 7/1999 | Peyret et al. | |
| 5,937,066 A | 8/1999 | Gennaro et al. | |
| 5,991,411 A | 11/1999 | Kaufman et al. | |

(Continued)

FOREIGN PATENT DOCUMENTS

WO 9724831 7/1997

OTHER PUBLICATIONS

ATM and Credit Card Notification, Feb. 2005 (internet archive) pp. 1-2 www.thereareplaces.com/infgdes/money.atmnotif.htm.

(Continued)

*Primary Examiner* — Brandon Hoffman
(74) *Attorney, Agent, or Firm* — Lowenstein Sandler PC

(57) ABSTRACT

Embodiments of the present invention provide a secure remote password reset capability. In some embodiments, an exemplary method provides a remote reset of a password associated with a token in a computer system having a security server. A token-based authentication process is activated by connecting the token to the security server. A server-based authentication process is initiated in the security server by activating a password reset process in a security client. The server-based authentication process communicates with the token-based authentication process over a secure channel. An authentication credential is managed by a third party agent that supplies a query and the authentication credential as a correct response to the query to the security server. A prompt provided by the password reset process collects the authentication credential and a new password. After the authentication credential is validated mutually authentication is performed between the security server and the token. The token is updated with the new password based on a successful result of the mutual authentication.

15 Claims, 7 Drawing Sheets

U.S. PATENT DOCUMENTS

| | | |
|---|---|---|
| 5,991,882 A * | 11/1999 | O'Connell ............... 726/18 |
| 6,005,942 A | 12/1999 | Chan et al. |
| 6,005,945 A | 12/1999 | Whitehouse |
| 6,011,847 A | 1/2000 | Follendore, III |
| 6,016,476 A | 1/2000 | Maes et al. |
| 6,044,155 A | 3/2000 | Thomlinson et al. |
| 6,072,876 A | 6/2000 | Obata et al. |
| 6,141,420 A | 10/2000 | Vanstone et al. |
| 6,178,507 B1 | 1/2001 | Vanstone |
| 6,179,205 B1 | 1/2001 | Sloan |
| 6,226,744 B1 | 5/2001 | Murphy et al. |
| 6,377,825 B1 | 4/2002 | Kennedy et al. |
| 6,490,680 B1 | 12/2002 | Scheidt et al. |
| 6,539,093 B1 | 3/2003 | Asad et al. |
| 6,636,975 B1 | 10/2003 | Khidekel et al. |
| 6,643,701 B1 | 11/2003 | Aziz et al. |
| 6,687,190 B2 | 2/2004 | Momich et al. |
| 6,691,137 B1 | 2/2004 | Kishi |
| 6,698,654 B1 | 3/2004 | Zuppicich |
| 6,734,886 B1 * | 5/2004 | Hagan et al. ............... 715/853 |
| 6,760,752 B1 | 7/2004 | Liu et al. |
| 6,804,687 B2 | 10/2004 | Sampson |
| 6,819,766 B1 | 11/2004 | Weidong |
| 6,826,686 B1 | 11/2004 | Peyravian |
| 6,829,712 B1 | 12/2004 | Madoukh |
| 6,880,037 B2 | 4/2005 | Boyer |
| 6,880,084 B1 | 4/2005 | Brittenham et al. |
| 6,898,605 B2 | 5/2005 | Constantino |
| 6,898,714 B1 | 5/2005 | Nadalin et al. |
| 6,941,326 B2 | 9/2005 | Kadyk et al. |
| 6,970,970 B2 | 11/2005 | Jung et al. |
| 6,978,933 B2 | 12/2005 | Yap et al. |
| 6,986,040 B1 | 1/2006 | Kramer et al. |
| 7,007,105 B1 | 2/2006 | Sullivan et al. |
| 7,010,600 B1 | 3/2006 | Prasad et al. |
| 7,050,589 B2 | 5/2006 | Kwan |
| 7,051,213 B1 | 5/2006 | Kobayashi et al. |
| 7,085,386 B2 | 8/2006 | Audebert et al. |
| 7,114,028 B1 | 9/2006 | Green et al. |
| 7,156,302 B2 | 1/2007 | Yap et al. |
| 7,159,763 B2 | 1/2007 | Yap et al. |
| 7,185,018 B2 | 2/2007 | Archbold et al. |
| 7,251,728 B2 | 7/2007 | Toh et al. |
| 7,278,581 B2 | 10/2007 | Ong |
| 7,299,364 B2 | 11/2007 | Noble et al. |
| 7,302,585 B1 | 11/2007 | Proudler et al. |
| 7,356,688 B1 | 4/2008 | Wang |
| 7,374,099 B2 | 5/2008 | de Jong |
| 7,386,705 B2 | 6/2008 | Low et al. |
| 7,451,921 B2 | 11/2008 | Dowling et al. |
| 7,475,250 B2 | 1/2009 | Aull et al. |
| 7,475,256 B2 | 1/2009 | Cook |
| 7,480,384 B2 | 1/2009 | Peyravian et al. |
| 7,502,793 B2 | 3/2009 | Snible et al. |
| 7,571,321 B2 | 8/2009 | Appenzeller et al. |
| 7,602,910 B2 | 10/2009 | Johansson et al. |
| 7,769,996 B2 | 8/2010 | Randle et al. |
| 7,822,209 B2 | 10/2010 | Fu et al. |
| 2001/0036276 A1 | 11/2001 | Ober et al. |
| 2002/0004816 A1 | 1/2002 | Vange et al. |
| 2002/0007351 A1 | 1/2002 | Hillegass et al. |
| 2002/0007359 A1 | 1/2002 | Nguyen |
| 2002/0010679 A1 | 1/2002 | Felsher |
| 2002/0029343 A1 | 3/2002 | Kurita |
| 2002/0056044 A1 | 5/2002 | Andersson |
| 2002/0059144 A1 | 5/2002 | Meffert et al. |
| 2002/0064095 A1 | 5/2002 | Momich et al. |
| 2002/0080958 A1 | 6/2002 | Ober et al. |
| 2002/0099727 A1 | 7/2002 | Kadyk et al. |
| 2002/0112156 A1 | 8/2002 | Gien et al. |
| 2002/0120842 A1 | 8/2002 | Bragstad et al. |
| 2002/0133707 A1 | 9/2002 | Newcombe |
| 2002/0171546 A1 | 11/2002 | Evans et al. |
| 2002/0184149 A1 | 12/2002 | Jones |
| 2003/0005291 A1 | 1/2003 | Burn |
| 2003/0012386 A1 | 1/2003 | Kim et al. |
| 2003/0028664 A1 | 2/2003 | Tan et al. |
| 2003/0035548 A1 | 2/2003 | Kwan |
| 2003/0056099 A1 | 3/2003 | Asanoma et al. |
| 2003/0075610 A1 | 4/2003 | Ong |
| 2003/0093695 A1 | 5/2003 | Dutta |
| 2003/0115455 A1 | 6/2003 | Aull et al. |
| 2003/0115466 A1 | 6/2003 | Aull et al. |
| 2003/0115467 A1 | 6/2003 | Aull et al. |
| 2003/0115468 A1 | 6/2003 | Aull et al. |
| 2003/0167399 A1 | 9/2003 | Audebert et al. |
| 2003/0172034 A1 | 9/2003 | Schneck et al. |
| 2004/0042620 A1 | 3/2004 | Andrews et al. |
| 2004/0053642 A1 | 3/2004 | Sandberg et al. |
| 2004/0066274 A1 | 4/2004 | Bailey |
| 2004/0088562 A1 | 5/2004 | Vassilev et al. |
| 2004/0096055 A1 | 5/2004 | Williams et al. |
| 2004/0103324 A1 | 5/2004 | Band |
| 2004/0103325 A1 * | 5/2004 | Priebatsch ............... 713/202 |
| 2004/0120525 A1 | 6/2004 | Miskimmin et al. |
| 2004/0144840 A1 | 7/2004 | Lee et al. |
| 2004/0146163 A1 | 7/2004 | Asokan et al. |
| 2004/0153451 A1 | 8/2004 | Phillips et al. |
| 2004/0162786 A1 | 8/2004 | Cross et al. |
| 2004/0230831 A1 | 11/2004 | Spelman et al. |
| 2005/0022123 A1 | 1/2005 | Costantino |
| 2005/0033703 A1 | 2/2005 | Holdsworth |
| 2005/0109841 A1 | 5/2005 | Ryan et al. |
| 2005/0119978 A1 | 6/2005 | Ates |
| 2005/0123142 A1 | 6/2005 | Freeman et al. |
| 2005/0138390 A1 * | 6/2005 | Adams et al. ............... 713/185 |
| 2005/0144312 A1 | 6/2005 | Kadyk et al. |
| 2005/0184163 A1 | 8/2005 | de Jong |
| 2005/0184164 A1 | 8/2005 | de Jong |
| 2005/0184165 A1 | 8/2005 | de Jong |
| 2005/0188360 A1 | 8/2005 | de Jong |
| 2005/0262361 A1 | 11/2005 | Thibadeau |
| 2005/0279827 A1 | 12/2005 | Mascavage et al. |
| 2005/0289652 A1 | 12/2005 | Sharma et al. |
| 2006/0005028 A1 | 1/2006 | Labaton |
| 2006/0010325 A1 | 1/2006 | Liu et al. |
| 2006/0015933 A1 | 1/2006 | Ballinger et al. |
| 2006/0036868 A1 * | 2/2006 | Cicchitto ............... 713/182 |
| 2006/0043164 A1 | 3/2006 | Dowling et al. |
| 2006/0072747 A1 | 4/2006 | Wood et al. |
| 2006/0073812 A1 | 4/2006 | Punaganti Venkata et al. |
| 2006/0075133 A1 | 4/2006 | Kakivaya et al. |
| 2006/0075486 A1 | 4/2006 | Lin et al. |
| 2006/0101111 A1 | 5/2006 | Bouse et al. |
| 2006/0101506 A1 | 5/2006 | Gallo et al. |
| 2006/0173848 A1 | 8/2006 | Peterson et al. |
| 2006/0174104 A1 | 8/2006 | Crichton et al. |
| 2006/0206932 A1 | 9/2006 | Chong |
| 2006/0208066 A1 | 9/2006 | Finn et al. |
| 2006/0226243 A1 | 10/2006 | Dariel |
| 2006/0294583 A1 | 12/2006 | Cowburn et al. |
| 2007/0014416 A1 | 1/2007 | Rivera et al. |
| 2007/0074034 A1 | 3/2007 | Adams et al. |
| 2007/0112721 A1 | 5/2007 | Archbold et al. |
| 2007/0113267 A1 | 5/2007 | Iwanski et al. |
| 2007/0113271 A1 | 5/2007 | Pleunis |
| 2007/0118891 A1 | 5/2007 | Buer |
| 2007/0162967 A1 | 7/2007 | de Jong et al. |
| 2007/0169084 A1 | 7/2007 | Frank et al. |
| 2007/0189534 A1 | 8/2007 | Wood et al. |
| 2007/0204333 A1 | 8/2007 | Lear et al. |
| 2007/0230706 A1 | 10/2007 | Youn |
| 2007/0239730 A1 * | 10/2007 | Vigelette et al. ............... 707/10 |
| 2007/0271601 A1 * | 11/2007 | Pomerantz ............... 726/5 |
| 2007/0277032 A1 | 11/2007 | Relyea |
| 2007/0280483 A1 | 12/2007 | Fu |
| 2007/0282881 A1 | 12/2007 | Relyea |
| 2007/0283163 A1 | 12/2007 | Relyea |
| 2007/0288745 A1 | 12/2007 | Kwan |
| 2007/0288747 A1 | 12/2007 | Kwan |
| 2008/0005339 A1 | 1/2008 | Kwan |
| 2008/0019526 A1 | 1/2008 | Fu |
| 2008/0022086 A1 | 1/2008 | Ho |
| 2008/0022088 A1 | 1/2008 | Fu et al. |
| 2008/0022121 A1 | 1/2008 | Fu et al. |
| 2008/0022122 A1 | 1/2008 | Parkinson et al. |
| 2008/0022128 A1 | 1/2008 | Proudler et al. |

| | | |
|---|---|---|
| 2008/0056496 A1 | 3/2008 | Parkinson |
| 2008/0059790 A1 | 3/2008 | Parkinson |
| 2008/0059793 A1 | 3/2008 | Lord et al. |
| 2008/0069338 A1 | 3/2008 | Relyea |
| 2008/0069341 A1 | 3/2008 | Relyea |
| 2008/0072283 A1 | 3/2008 | Relyea |
| 2008/0077794 A1 | 3/2008 | Arnold et al. |
| 2008/0077803 A1 | 3/2008 | Leach et al. |
| 2008/0133514 A1 | 6/2008 | Relyea |
| 2008/0148047 A1 | 6/2008 | Appenzeller et al. |
| 2008/0189543 A1 | 8/2008 | Parkinson |
| 2008/0209224 A1 | 8/2008 | Lord |
| 2008/0209225 A1 | 8/2008 | Lord |
| 2008/0229401 A1 | 9/2008 | Magne |
| 2009/0003608 A1 | 1/2009 | Lee et al. |
| 2009/0133107 A1 | 5/2009 | Thoursie |

OTHER PUBLICATIONS

AMD Announces Specification for Open Platform Management Architecture, Feb. 28, 2005, pp. 1-2 http://www.thefreelibrary,com/AMD+Announces+ Specification+for+Open+Platform+Management+Architecture-a0129342307.

Bellvin and Merritt, "Augmented Encrypted Key Exchange: a Password-Based Protocol Secure Against Dictionary Attacks and Password File Compromise", Proceedings of the 1st ACM Conference on Computer and Communications Security, Nov. 1993.

Schneier, "Applied Cryptography: Protocols, Algorithms, and Secure Code in C", 1996, John Wiley & Sons, Inc., Second Edition, pp. 455-456.

Zuccherato, Robert, Elliptic Curve Cryptography Support in Entrust, May 9, 2000.

Red Hat Certificate System, http://www.redhat.com/f/pdf/rhas/DirSecProductSheetCertificateSystem.pdf, Jun. 2005.

PKCS# v2.20: Cryptographic Token Interface Standard, RSA Laboratories, Jun. 28, 2004 (see, e.g. Chapter 10, Objects) (see www.rsasecurity,com, 407 pages).

Cryptographic Message Syntax, R. Housley, Request for Comments (RFC) 2630, Network Working Group, The Internet Society, Jun. 1999.

Balfanz (Dirk ABalfanz, "Access Control for Ad-Hoc Collaboration", Princeton University Jan. 2001).

* cited by examiner

METHODS AND SYSTEMS FOR REMOTE PASSWORD RESET USING AN AUTHENTICATION CREDENTIAL MANAGED BY A THIRD PARTY

FIELD OF THE INVENTION

The present invention relates generally to security in complex heterogenous processing environments and more particularly, to providing a password reset mechanism for a security password for a token.

BACKGROUND OF THE INVENTION

The size, scope and complexity of computer systems and networks continue to grow rapidly along with the sensitivity of the content of such systems. Further, open systems are proliferating, while conventional user access paradigms are changing for organizations of all types and sizes, from main offices or workplaces having dedicated IT systems to decentralized networks of IT servers and the like. Accordingly, system security rapidly becomes a major concern. Where user or worker access is accomplished through public networks such as the Internet, where remote access is accomplished through public networks, where a portion of the access is conducted through a public network, or where secure access is required for individuals in a multi-user environment, security and identify verification and management become more important in maintaining system and network security and data integrity.

Further complicating the challenge of maintaining security in a computing environment is the scenario where a password for a token, such as a smart card is lost. In conventional systems, a security officer or the like can be provided with a global password to unlock a smart card where the user password was lost. Several problems can arise if a security officer leaves their job, because the security officer password must be reset or changed. Further, such a global password system is not easily scalable. For example, in a large system where hundreds or perhaps thousands of tokens are in use, the security officer password must be the same for all tokens leading to a watershed security problem if the security officer password is compromised. Alternatively, if security officer passwords are managed on a per token basis, then a list associated with the security officer passwords for each token would be long and difficult to maintain and manage.

It would be desirable therefore to provide token management in a computer system environment that could adapt to the changing requirements of customers or third parties who manage system security, while reducing the security management burden on the token management system.

While a general background including problems in the art are described hereinabove, with occasional reference to related art or general concepts associated with the present-invention, the above description is not intending to be limiting since the primary features of the present invention will be set forth in the description which follows. Some aspects of the present invention not specifically described herein may become obvious after a review of the attendant description, or may be learned by practice of the invention. Accordingly, it is to be understood that both the foregoing general description and the following detailed description are exemplary and explanatory only in nature and are not restrictive of the scope or applicability of the present invention.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Figure 1:
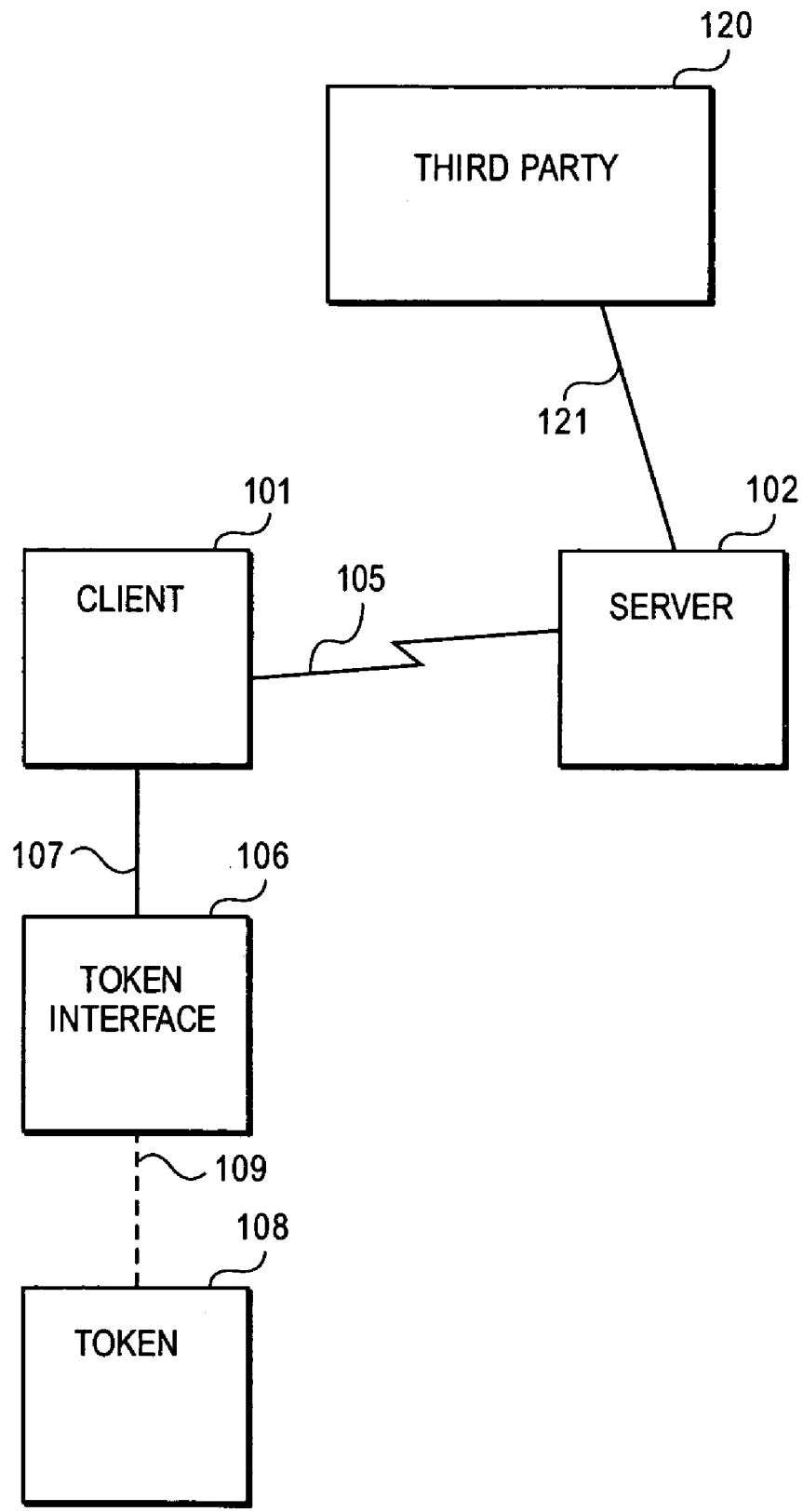
FIG. 1 is a diagram illustrating exemplary components of a computer system consistent with embodiments of the present invention.

Embodiments of the present invention provide methods and systems for resetting a password in a token using an authentication credential provided by a third party. In accordance with one or more embodiments, an exemplary method can provide a remote reset of a password associated with a token in a computer system. The computer system can include a security server, which provides the remote reset of the password for use by the token to access the computer system. The method can include activating a token-based authentication process in the token by connecting the token to the security server. A server-based authentication process can be activated in the security server based on activating a password reset process, such as a password entry dialog, in a security client. The password reset process can be activated by a requester of the remote reset, for example by indicating during a login process that a password reset is required. The server-based authentication process can establish and begin communicating with the token-based authentication process over a secure communication channel. It will be appreciated that the remote reset is based on an authentication credential, such as a social security number, a mother's maiden name, or other out-of-band parameter that can be determined in advance of the request for the reset. The authentication credential can be managed by a third party agent that supplies a query associated with a prompt to one or more of the security client and the security server and supplies the authentication credential as a correct response to the query associated with the prompt to the security server. The term "third party" is used herein to indicate ownership or management by an entity separate from, for example, the owner, manufacturer, manager, developer or the like, of client and the server.

The prompt can be provided using the password reset process and is for entry of the authentication credential by the requester of the password reset and for entry of the new password. The authentication credential entered by the requester of the password reset during the activated password reset process can be validated by comparing the correct response to the query with the entered authentication credential. The requester is associated with authorized use of the token. When the authentication credential is successfully validated, the method can include mutually authenticating, in the respective security server and the token, a security parameter, such as an authentication key derived from a master key, independently stored with the token and the security server. Once the mutual authentication as been successfully performed, the token is updated with the new password based on a successful result of the mutual authentication. The exemplary method can further include separately prompting the requester for the new password and updating the token with the new password when mutual authentication is successful.

According to one or more embodiments, the security client includes an enterprise security client and the token includes one of a universal serial bus (USB) token and a smartcard, and wherein the computer system includes a card management system. Further, the exemplary method can be implemented in an apparatus configured to perform the method, or can be embodied in a computer readable medium having computer executable instructions for performing the method.

Other embodiments can include an exemplary server in a computer system for providing a remote reset of a password associated with a token. The computer system can include at least a security client, a third party server, and/or a token interface. The server can include a security processor, which can be a general purpose processor, dedicated controller or the like, and can be configured to activate a server-based authentication process when a password reset process is activated in the security client. The activation of the password reset process is associated with the insertion of the token in the token interface. The password reset process is also associated with a request to reset the password made by a requester. The insertion of the token further activates a token-based authentication process. The exemplary security processor is further configured to establish a secure channel coupling the server-based authentication process and the token-based authentication process. The exemplary server also includes a system interface for coupling to the third party server. The third party server is configured to activate a credential process for providing an authentication credential to the server-based authentication process or the password reset process. The authentication credential is then provided by the requester as a correct response to a query provided in a prompt, such as requesting entry of a social security number, secret question or the like, which is managed by the third party. The prompt can be provided by the password reset process or the token-based authentication process, and also includes a request for a new password. The password reset process and/or the server-based authentication process can be configured to validate the authentication credential.

In the exemplary server, the password reset process and/or the server-based authentication process can be configured to validate the authentication credential. Once the authentication credential is validated, the server-based authentication process and the token-based authentication process are configured to mutually authenticate a security parameter independently stored with the token and with the security processor. The security processor is further configured to mutually authenticate a security parameter through interaction with the server-based authentication process and the token-based authentication process security, the security parameter independently stored with the token and with the security processor based on successfully validating the authentication credential. Once the mutual authentication is successful, for example by producing a mutual result based on processing of the security parameter such as an authentication key, the token is updated with the new password.

In still other embodiments, an exemplary enterprise security client can be provided in a computer system for providing a remote reset of a password associated with a token. The computer system can include at least a server, a third party server, and a token interface. The enterprise security client can include a client security processor configured to activate a password reset process. The activation can be associated with the connection of the token to the token interface, for example via insertion of the token in the token interface, and a request to reset the password made by a requester, during for example a login dialog. The insertion of the token further activates a token-based authentication process and through operation and activation of the password reset process, further activates a server-based authentication process. The enterprise security client can facilitate the establishment of a secure channel between the server-based authentication process and the token-based authentication process, the client passing a security packet between processes. Although no direct role is played by the client in the establishment of the secure channel, the client must successfully pass the security packet from the server to the token based authentication process. The enterprise security client further includes a system interface for coupling to the third party server. As noted, the third party server is configured to activate a credential process for providing an authentication credential to the enterprise server-based authentication process and/or the password reset process. The authentication credential can be provided by the requester, for example, as a correct response to a query provided in a prompt by the password reset process and/or the token-based authentication process. The prompt further includes a request for a new password.

The enterprise security client can facilitate the mutual authentication of a security parameter performed through interaction with the server-based authentication process and the token-based authentication process security. The security parameter is independently stored with the token and with the security processor and the mutual authentication can be performed based on successfully validating the authentication credential. When the authentication credential is validated and the mutual authentication is performed successfully, the token can be updated with the new password based on a successful result of the mutual authentication.

In accordance with still other embodiments, a computer system provides a remote reset of a password associated with a token. The computer system nominally includes at least a security server, a third party server, and a token interface. The computer system also includes, in accordance with various embodiments, a security server processor configured to activate a server-based authentication process when the password reset process is activated. Activation of the password reset process is based on the insertion of the token in the token interface and the generation of a request made by a requester to reset the password to a new password. The insertion of the token further activates a token-based authentication process. The computer system further includes a secure channel coupling the server-based authentication process and the token-based authentication process. The computer system also includes a third party processor associated with the third party server. The third party processor is configured to activate a credential process for providing an authentication credential to the server-based authentication process and/or the password reset process. The authentication credential is provided by the requester as a correct response to a query provided in a prompt by the password reset process and/or the token-based authentication process. The prompt can include a request for the new password.

The password reset process and/or the server-based authentication process are configured to validate the authentication credential, whereupon the server-based authentication process and the token-based authentication process are configured to mutually authenticate a security parameter independently stored with the token and with the security server. Once validation of the authentication credential and mutual authentication are successfully accomplished, the password reset process is configured to update the token with the new password.

Reference will now be made in detail to exemplary embodiments of the invention, which are illustrated in the accompanying drawings. Wherever possible, the same reference numbers will be used throughout the drawings to refer to the same or like parts.

Referring now to FIG. 1, a simplified and representative environment associated with a computer system will be discussed and described. The environment includes a client 101, a token 108, a server 102, and a third party agent such as third party server 120 connected to the server 102. The server 102 and client 101 are connected via a connection 105 which can be a direct connection such as a wired or wireless connection or can be an indirect connection such as a connection through the Internet, private network or the like. It will also be appreciated that in some instances, the server 102 and client 101 can exist within the same computer and therefore can be connected with a data bus or high speed serial connection or the like. The server 102 naturally has access to information stored locally at the server 102, and also can access information stored remotely in various external data systems (not shown) provided a proper interface exists to the external data systems. It will be appreciated that the server 102 may be a general purpose computer or dedicated computing platform configured to execute secure and/or unsecure (or open) applications through a multiple user operating system (not shown). While many operations are performed in connection with the client 101, the server 102 can operate independently for certain procedures. The server 102 may be implemented with general purpose server platforms as known to those skilled in the art from Intel, Advanced Micro Devices, Hewlett-Packard, and/or others or can be implemented with other custom configured server architectures. The server 102 may interact with the client 101 over the connection 105, which can include, for example, a communication network. The connection 105 provides a communication channel for the server 102 and the client 101 to exchange data and commands, as well as for the server 102 to interface to the token 108.

The client 101 can include a general purpose computer or dedicated computing platform configured to execute secure and/or open applications through the multi-user operating system of server 102 or can operate through an independent operating system or independent version of the operating system of server 102. The client 101 can include a personal computer, a workstation, a thin client, a thick client, or other similar computing platform. It will be appreciated that thin client means a computer or client in a client-server architecture having little or no application logic and therefore having a small boot image. A thin client depends primarily on the central server, such as server 102, for processing activities. Therefore client 101, when operating as a thin client has no more software than is required to connect to server 102, to perform a login procedure, and the like.

It can further be seen that client 101 is configured to interface with the token 108 through a token interface 106 connected through a link 107. The token 108 is connected to token interface 106 through connection 109 which can be a universal serial bus (USB) connection, an edge connector, or some other type of connection as would be appreciated. The client 101, the token 108 and the server 102 can be configured in accordance with known techniques so that the server 102 can connect to the token 108 transparently through the client 101. In accordance with known techniques, the connection 105 can be a secure connection, however, additional secure channels can be established separately to connect the server 102 and the token 108, for example for mutual authentication prior to conducting card management functions.

In accordance with various embodiments, the server 102 can be connected to the third party server 120 through a connection 121, which can be one of a variety of different types of known connections. The third party server 120 is configured to maintain information associated with an authentication credential such as a social security number, answer to a secret question, or the like. The third party server 120 independently manages the authentication credential and a query associated with the authentication credential that can act as a reminder or prompt for a user to enter the credential as will be described. It will be appreciated that while some systems use various methods for authentication, the use of a third party server or agent to manage such credentials in connection with remotely resetting a password associated with a token or smart card provides enhanced security.

Figure 2:
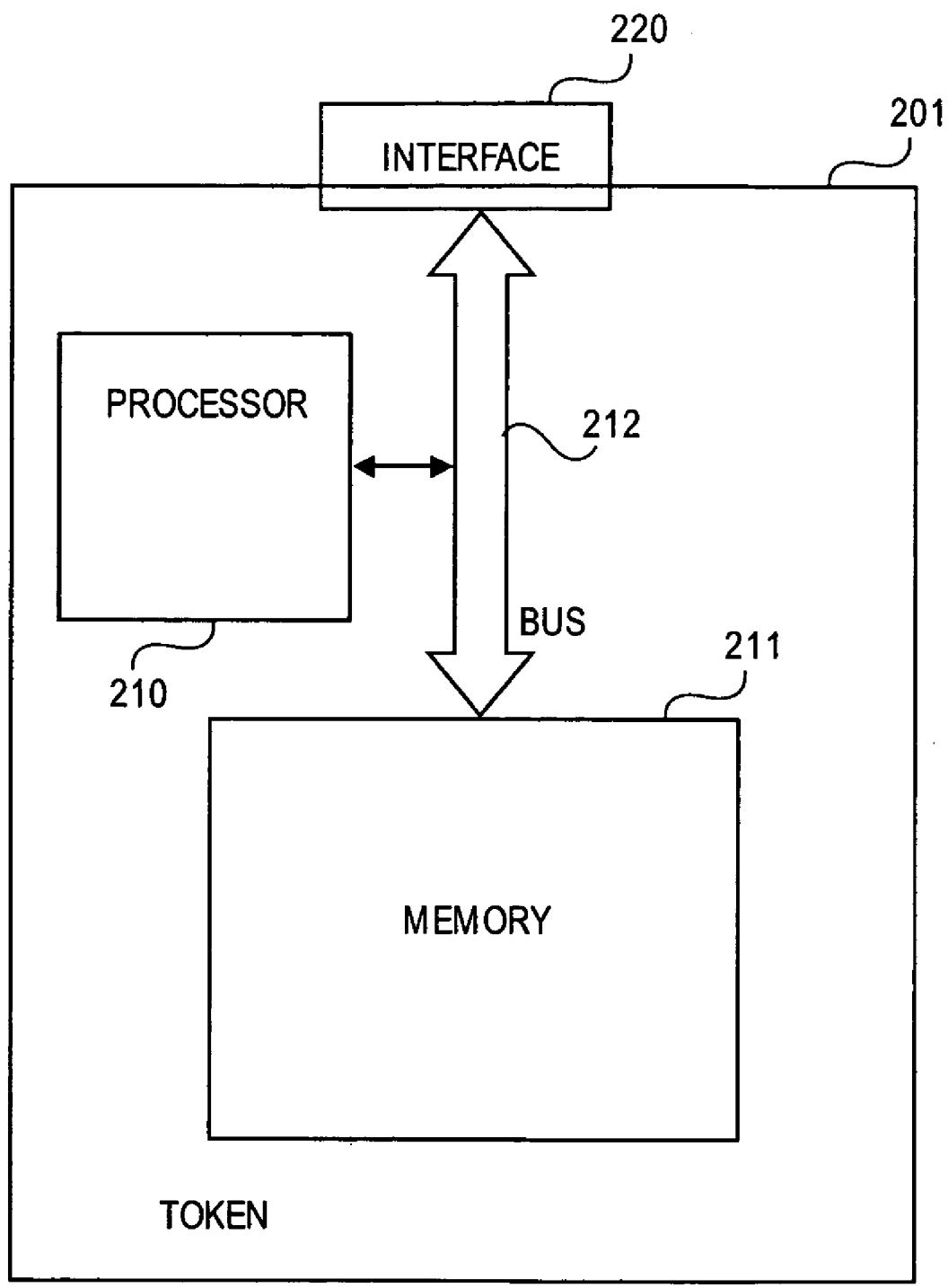
FIG. 2 is a diagram illustrating an exemplary token having a processor a memory and an interface consistent with operation in accordance with the present invention.

A typical token, described in connection with FIG. 1 as token 108 is described in greater detail in connection with FIG. 2, which illustrates an exemplary token 201 having a processor 210, a memory 211, an interface 220, and a bus 212 or other connection interconnecting the elements. The token 201 is an integral part of any two factor authentication system where the token 201 represents a first possessor factor in the security model. In other words, possession of the token 201 assumes that the holder of the token 201 is the authorized user. The password, which can include, for example a PIN (personal identification number), represents the second factor in the two factor security model and, in connection with the first factor, the possession of the token 201, completes the two-factor security model.

It will be appreciated that the processor 210 can be one of a variety of different processors including general purpose processors, custom processors, controllers, compact 8 bit processors or the like, however, processor 210 must be configured for execution of applications for mutual authentication or the like in accordance with the invention. The memory 211 can also be one or a combination of a variety of types of memory such as random access memory (RAM), read only memory (ROM), flash memory, dynamic RAM (DRAM) or the like. It will also be appreciated that in most instances, the token 201 will derive power from the interface 220, that is, will derive power from the host device such as a token interface unit. The interface unit will provide power as part of the interface standard. For example, the USB standard calls for pins 1 and 4 to provide Vcc and GND, with Vcc being around 5 volts DC. It should be noted that in some tokens, additional features are present for additional security factors such as biometrics or the like.

Figure 3:
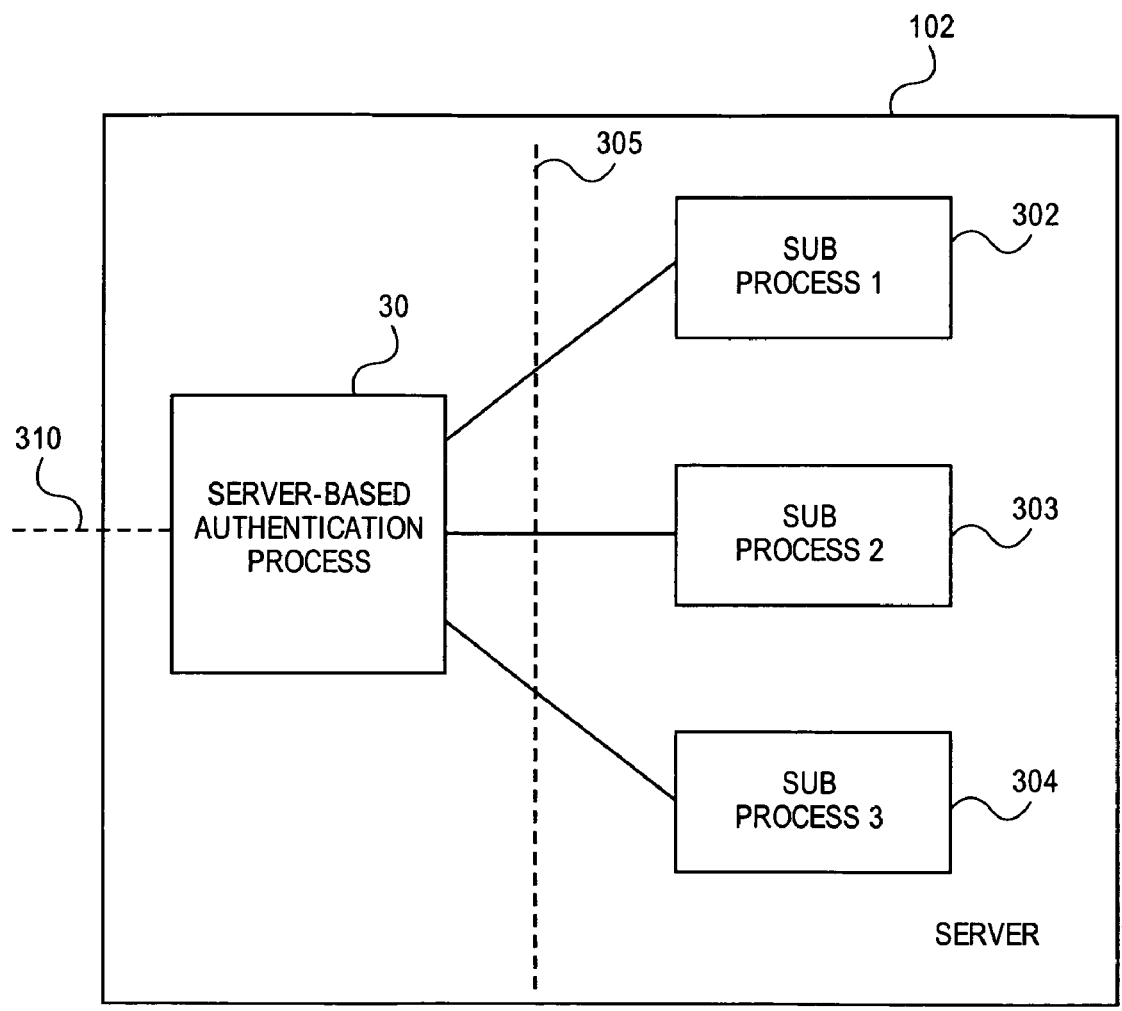
FIG. 3 is a diagram illustrating processes associated with an exemplary server in accordance with embodiments of the present invention.

A typical server 102 in accordance with various embodiments is further illustrated in FIG. 3. Server 102 can include a server based authentication process 30, which can be a software program or process executing on a processor associated with the server 102. The server 102 can also include an interface 310, which can be a communication link or the like for communicating with the token as will be described. It will be appreciated that, while the interface 310 may be protected using a secure sockets layer (SSL) type protection, additional security can be provided as will be described, by establishing a secure channel with the token for mutual authentication. Thus, the connection 310 can be used for making a general purpose connection to a client such as client 101 described in connection with FIG. 1. The connection 310 can be used by the client 101 to connect with the server 102 for card management purposes and the like.

A typical server 102 with server based authentication process 30 configured for example, as a token processing system, further includes subsystems or subprocesses such as subprocess 1 302, subprocess 2 303 and subprocess 3 304 for providing security support. For example, subprocess 1 302 can be configured as a certificate authority for generating certificates according to a standard such as the X.509 standard. Subprocess 2 303 can be configured as a token key service to maintain security master keys, which are used during mutual authentication as will be described. The token keys are preferably symmetric keys derived from a single master key (MK) combined with the token serial number according to a diversification mechanism as specified, for example, in various security standards. The manufacturer of the token can write the keys, which can be encrypted with data encryption standard 2 (DES 2) encryption for additional security to form a DES2 key set, into the token when it is initialized. The token manufacturer can also transmit the single MK to the administrator of the server based authentication process 30, where the key can be installed into a cryptographic module associated with the server based authentication process 30. It should be noted that once the MK is passed to the server based authentication process 30, it typically cannot be extracted from the cryptographic module. During the initial enrollment associated with the token, the token keys, such as the DES2 key set, can be replaced with another set of token keys derived from a new or different Master Key which is not known to the manufacturer. When the server based authentication process 30 needs to establish a secure channel with the token, as will be described, secure channel session keys for the token can be derived by a subprocess such as subprocess 2 303. Other subprocesses such as the subprocess 3 304 can be used to perform additional security functions such as data recovery. For example, in the subprocess 3 304, private keys from a user can be recovered in connection with an existing module associated with the server 102.

Figure 4:
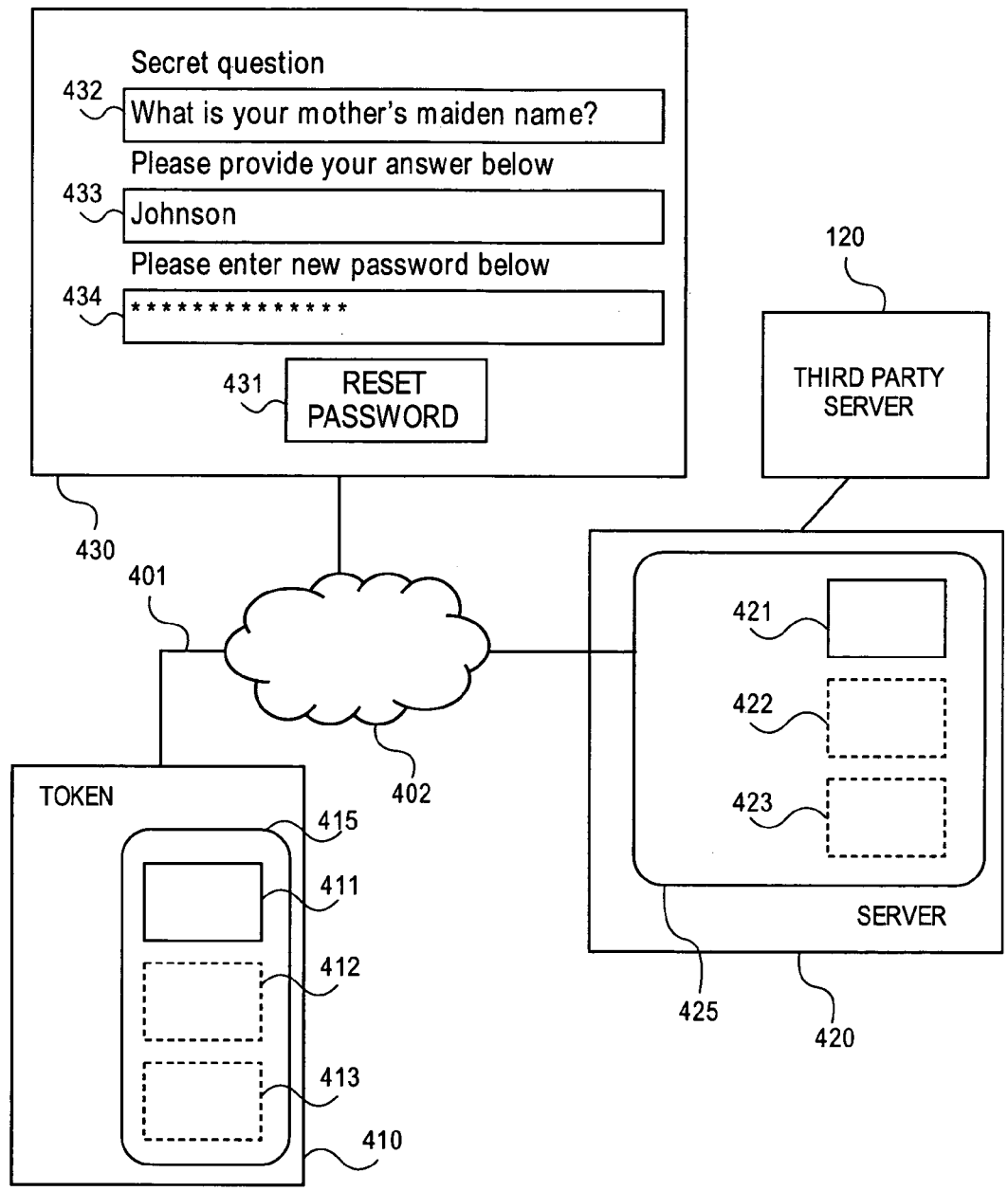
FIG. 4 is a diagram illustrating components of a mutual authentication between a token and a server in accordance with the present invention.

An exemplary scenario for a remote password reset is shown in FIG. 4. A token 410 can be any of the tokens described in connection with FIG. 1 and FIG. 2, or any other token capable of processing card management operations associated with a password reset. Accordingly, the token 410 can, as described in connection with FIG. 2, include a processor 210 for execution of processes, programs, applets and the like as would be appreciated. The token-based authentication process 415 can be used, for example, to perform mutual authentication in accordance with the invention. The token 410 can be connected to a server 420, which can be executing a server-based authentication process 425. The token based authentication process 415 has access to symmetrical keys 411, 412 and 413, one of which can be used for mutual authentication as will be described. Likewise, the server based authentication process 425 can include symmetrical keys 421, 422 and 423. It will be appreciated that the symmetrical keys 411, 412 and 413 of the token 410 are symmetric with respect to symmetrical keys 421, 422 and 423 of the server 420. For example, the respective symmetrical keys 411, 412, 413 of the token 410 and symmetrical keys 421, 422, 423 of the server 420 can be identical.

When a user activates a process such as a login process to a user privileged application or the like, and a password reset is required, a dialog or prompt 430 can be displayed, for example in a client process such as a password reset process 402 to which the token 410 is connected through a secure link 401. The prompt 430 can contain information managed by the third party server 120 and provided to the password reset process 402 through server 420. A reset password selector 431 such as a dialog button can be used to indicate that a password reset is required, at which time the server based authentication process 425, in connection with a third party can provide a query and an authentication credential, which is the correct response to the query, to the password reset process 402. The query can be displayed in text box 432 such that a user or requester of the password reset can enter the authentication credential in data entry box 433. It will be appreciated that the authentication credential can be a social security number, an answer to a secret question such as mother's maiden name, city and state of birth, childhood pet, or the like. During the display of the prompt 430, the user or requester can also enter the new password in data entry box 434, which can be protected by not echoing the actual password but rather by displaying a placeholder character such as an asterisk or the like. Once the authentication credential is entered, a secure connection can be established between the token 410 and the server 420 for mutual authentication using the authentication credential in place of the password, or alternatively, the authentication credential can be independently authenticated.

The server 420 during mutual authentication with the token 410 can compare security keys such as the symmetrical keys 411, 412 and 413 and symmetrical keys 421, 422 and 423 in one of a number of possible ways involving, for example, handshaking between the token 410 and the server 420. If the authentication credential is authenticated, then the new password can be sent to the token-based authentication process 415 and written to the token 410.

Figure 5:
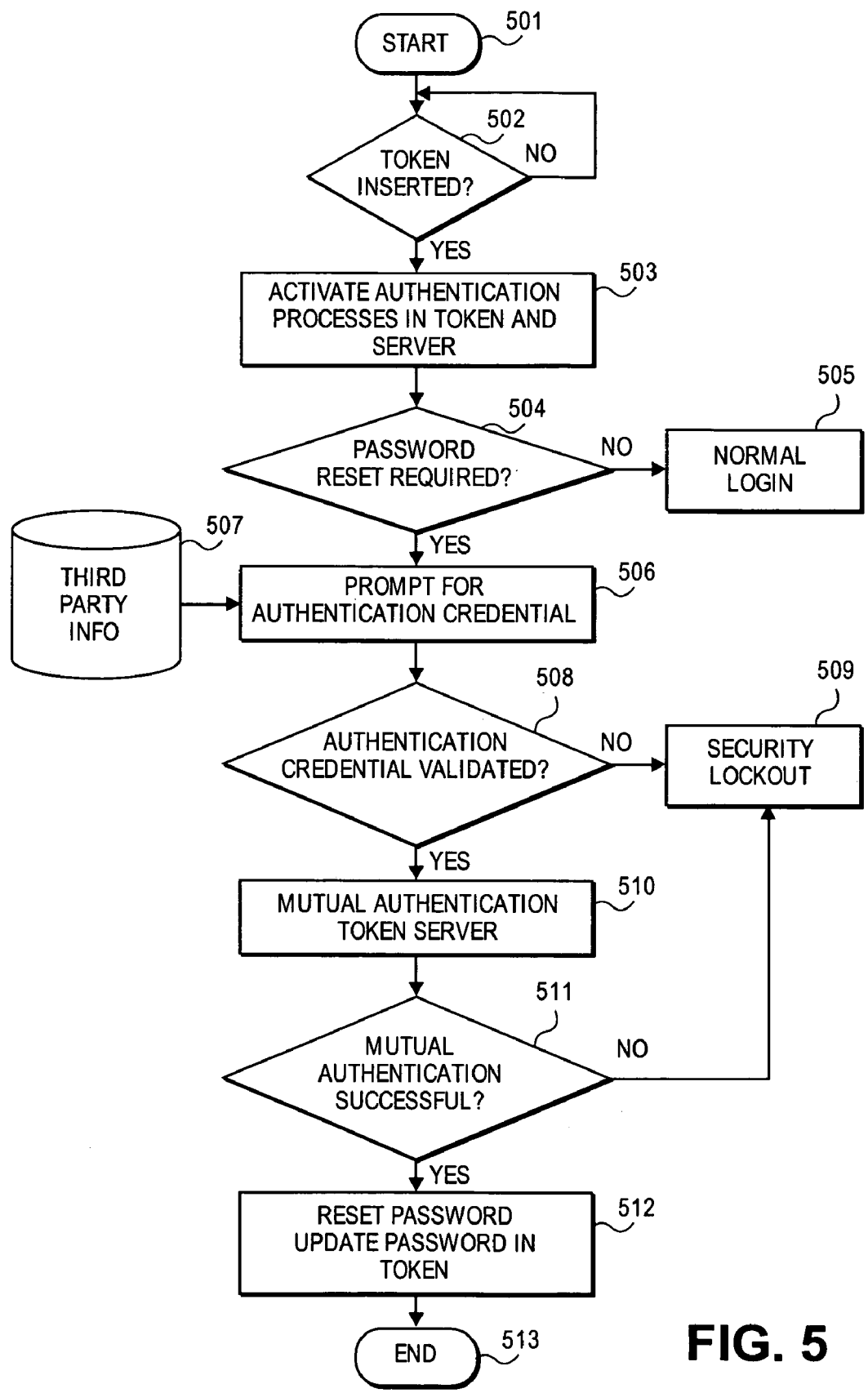
FIG. 5 is a flow chart illustrating an exemplary procedure for resetting a password in accordance with the present invention.

An exemplary method for password reset in accordance with the invention is shown in FIG. 5. After a start procedure 501, a determination can be made if the token is inserted in procedure 502. It will be appreciated that without the token insertion, any password reset operation will not be possible. Therefore, the procedure 502 will loop until a token is inserted. Meanwhile, in procedure 503, a token based authentication process can be activated to handle steps associated with password reset. A server based application process can also be activated in procedure 503. In procedure 504, an operation associated with a client connected to the token will begin to determine if a password reset if required, for example, a login dialog. As part of the login dialog, the user may request a password reset if the password has been lost and forgotten. If the password is remembered, a normal login will proceed at procedure 505. Otherwise, a prompt will be provided at procedure 506 based on third party managed information 507, such as an authentication credential as described herein and a query, the response to which is the authentication credential or is a value from which the authentication credential can be derived. The third party managed information 507 can be provided to the client by the server. If the authentication credential is validated at procedure 508, then a mutual authentication procedure 510 can be conducted during which at least one set of the symmetrical keys can be compared over a secure channel established between the token and the server. If the validation of the authentication credential fails at procedure 508, or if the mutual authentication procedure 510 fails as determined by the test procedure 511, then optionally a lockout procedure 509 can be invoked which can permanently disable the token. If the mutual authentication procedure 510 is successful as determined at test procedure 511, the password reset can be completed resulting in the new password being provided to the token over the secure channel between the server and the token. The password then can be written by the token based authentication process to the token memory during procedure 512. While the method is indicated as ending at 513, it will be appreciated that the process can be repeated, for example, if the token is removed and reinserted or removed and inserted elsewhere and a new password is again required. However, the third party manager may impose restrictions on the number of times a remote password reset can be conducted before a security audit or the like is performed.

Figure 6:
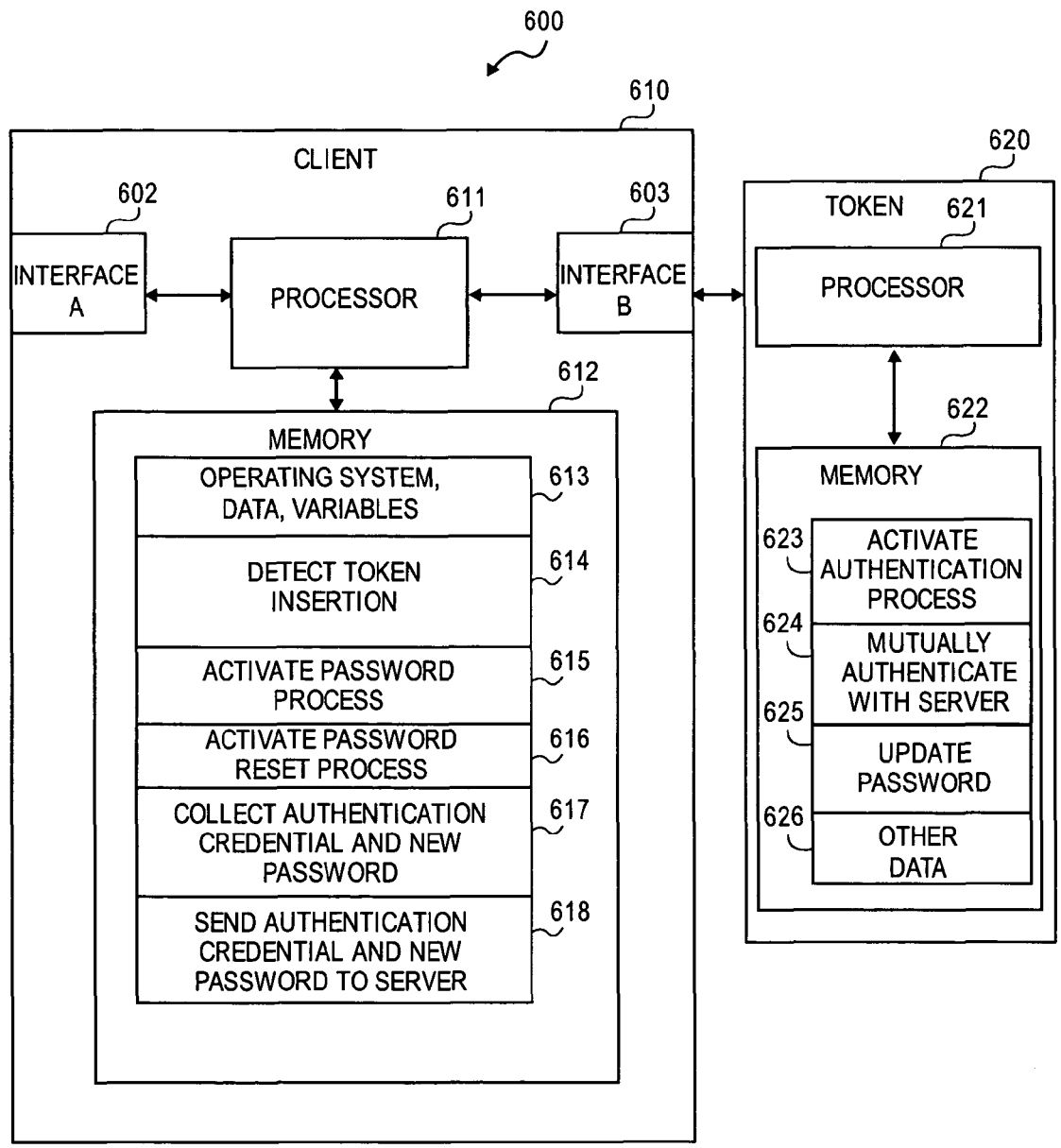
FIG. 6 is a block diagram illustrating portions of an exemplary client computer with interfaces and a token.

At least a portion 600 of an exemplary implementation of the present invention can be seen in connection with FIG. 6. A client 610 and a token 620 are shown in an operative condition. The client 610 can include processor 611 and memory 612. The token 620 includes a processor 621 and a memory 622, which are more or less interchangeable with processor 210 and memory 211 as shown in FIG. 2. The memory 612 can include processes which can be loaded into the processor 611, such as an operating system, data and variables 613 and other processes as described below. The client 610 can further include an interface A 602 for connection to other entities such as a server over a communications link.

The token 620 can be inserted, for example into a token interface such as interface B 603, whereupon the insertion of the token is detected at 614. In response to insertion, on the token side, a token based authentication process 623 can be activated. A user, through interaction with the client 610, can activate a password process 615 based on a request generated by a client application process for execution of a user privileged operation requiring a password. The password process 615 can cause a password to be requested at which time, if the user has forgotten the password, a password reset can be requested activating a password reset process 616. The password reset process 616 can provide a prompt including a query, the response to which is an authentication credential as noted. The authentication credential as entered by the user and the new password can be collected in procedure 617 and passed to the server at procedure 618.

When the server successfully validates the authentication credential, mutual authentication can take place between the server and a mutual authentication procedure 624 in token 620, for example over a secure channel. Upon successful mutual authentication, the new password can be provided by the server and updated in procedure 625. It will be appreciated that in addition to storing the new password, the token 620 can store additional data 626 such as the above noted symmetrical keys, other security information, or the like in connection with procedure.

Figure 7:
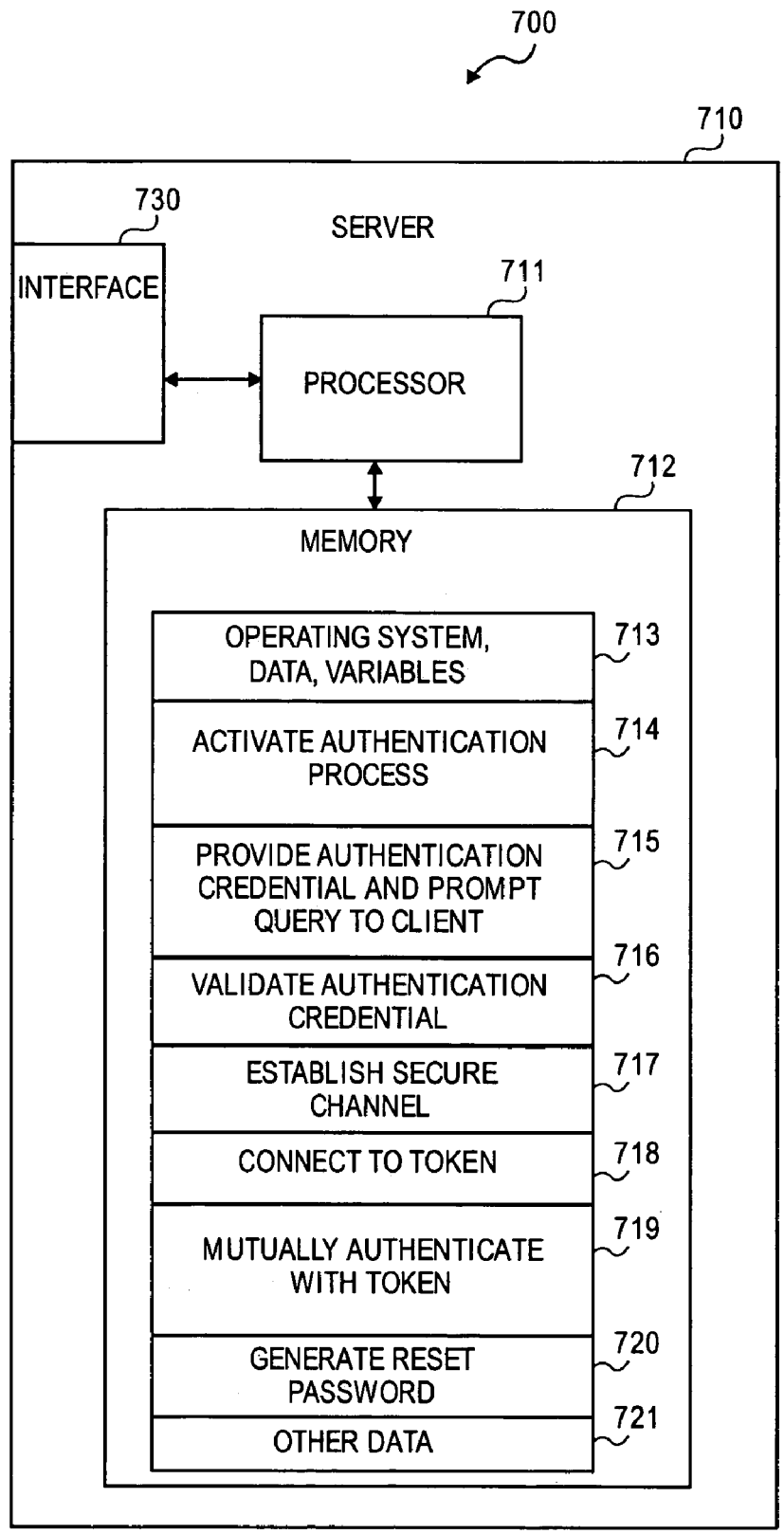
FIG. 7 is a block diagram illustrating portions of an exemplary server computer.

Another portion 700 of an exemplary implementation of the present invention can be seen in connection with FIG. 7. A server 710 is shown in an operative condition. The server 710 can include processor 711 and memory 712, and an interface 730 for establishing connections with other entities such as, for example, the client 610 and the token 620, as illustrated in FIG. 6. The connection between the server 710 and the token 620 is preferably established as a secure connection. The memory 712 can include processes which can be loaded into the processor 711, such as an operating system, data and variables 713 and other processes as described below. In response to a password reset process in the client 610, the server 710 can activate authentication process 714, which can incidentally provide information associated with a prompt to the client 610 including a query in procedure 715, the response to which is an authentication credential or a value from which an authentication credential can be derived. It should be noted that the query and authentication credential can be managed and provided to the server 710 by a third party, such as third party server 120 as described herein. Based on the values entered by the user and returned to the server 710 by the client 610, by way of the password reset process, the authentication credential can be validated in procedure 716. Upon successful validation of the authentication credential, a secure channel between the server 710 and the token 620 can be established in procedure 717 and a connection made between the server 710 and the token 620 in procedure 718. Once the secure channel is established and a connection made, a mutual authentication procedure 719 can be performed between the server 710 and the token 620 based on the symmetrical keys as described herein above. If the mutual authentication procedure 719 is successful, then the new or reset password entered by the user can be "generated" in procedure 720 and can be sent to the token 620 by the server 710, and the token can be updated with the new password by writing the password to memory 622 as a user privileged data object or the like. It should be noted that "generating" the new or reset password in procedure 720, can mean transferring the new password collected by the user to the token 620, for example, after validation of the authentication credential and mutual authentication. In alternative embodiments, the server may actually generate a new or reset password and notify the user, for example in the password reset dialog as described above, of the new password. It will be appreciated that other data 721 can include the symmetrical keys previously noted, at least one of which is used for mutual authentication.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of providing a remote reset of a password associated with a token, the remote reset provided by a security server, the method comprising:
   receiving, at the security server, a request to reset the password associated with the token, wherein the request is received over a secure channel,
   retrieving, from a third party agent by the security server, a query associated with the token and a correct response to the query;
   providing the query to the token over the secure channel;
   receiving a response to the query over the secure channel; and
   resetting the password based on a comparison of the received response to the correct response.

2. The method of claim 1, wherein providing the query comprises:
   providing an interface for entry of the response and for entry of a new password.

3. The method of claim 2, wherein resetting the password comprises:
   updating the token and the security server with the new password based on a successful comparison of the received response and the correct response.

4. The method of claim 1, further comprising:
   authenticating a security parameter independently stored with the token and the security server prior to resetting the password.

5. The method of claim 1, further comprising:
   prompting the token for a new password; and
   updating the token with the new password.

6. The method of claim 1, wherein the token is coupled to a security client, and the security server establishes the secure channel with the security client.

7. The method of claim 1, wherein the token includes one of a universal serial bus (USB) token and a smartcard.

8. An apparatus configured to perform the method of claim 1.

9. A non-transitory computer readable medium comprising computer executable instructions for performing the method of claim 1.

10. A server in a computer system providing a remote reset of a password associated with a token, the computer system including at least a security client, and a third party server, the server comprising:
- a network interface to the security client and the third party server;
- a processor coupled to the network interface and configured to:
  - establish a secure channel to the security client via the network interface receive a request to reset the password associated with the token over the secure channel,
  - retrieve, from the third party server via the network interface, a query associated with the token and a correct response to the query;
  - provide the query to the token over the secure channel;
  - receive a response to the query over the secure channel; and
  - reset the password based on a comparison of the received response to the correct response.

11. The server of claim 10, wherein the processor is further configured to:
- authenticate a security parameter independently stored with the token and with the processor.

12. The server of claim 10, wherein the processor is further configured to:
- provide an interface for entry of the response and for entry of a new password; and
- update the token with the new password based on a successful comparison of the received response and the correct response.

13. A computer system providing a remote reset of a password associated with a token, the computer system comprising:
- a third party server configured to maintain a query associated with the token and a correct response to the query; and
- a security server coupled to the third party server and configured to:
  - receive a request to reset the password associated with the token, wherein the request is received over a secure channel,
  - retrieve, from the third party server, the query associated with the token and the correct response to the query;
  - provide the query to the token over the secure channel;
  - receive a response to the query over the secure channel; and
  - reset the password based on a comparison of the received response to the correct response.

14. The computer system of claim 13, wherein the security server is further configured to:
- authenticate a security parameter independently stored with the token and with the security server.

15. The computer system of claim 13, wherein the security server is configured to:
- provide an interface for entry of the response and for entry of a new password; and
- update the token with the new password based on a successful comparison of the received response and the correct response.

* * * * *